(12) United States Patent
Chen

(10) Patent No.: US 11,040,478 B2
(45) Date of Patent: Jun. 22, 2021

(54) MOLD CHANGING APPARATUS

(71) Applicant: KING YUAN FU PACKAGING CO., LTD., New Taipei (TW)

(72) Inventor: Yu-Hui Chen, New Taipei (TW)

(73) Assignee: KING YUAN FU PACKAGING CO., LTD., New Taipei (TW)

(*) Notice: Subject to any disclaimer, the term of this patent is extended or adjusted under 35 U.S.C. 154(b) by 308 days.

(21) Appl. No.: 16/400,038

(22) Filed: May 1, 2019

(65) Prior Publication Data
US 2020/0139609 A1 May 7, 2020

(30) Foreign Application Priority Data

Nov. 2, 2018 (TW) .................................. 107214949

(51) Int. Cl.
*B29C 51/36* (2006.01)
*B29C 51/42* (2006.01)

(52) U.S. Cl.
CPC ............ *B29C 51/36* (2013.01); *B29C 51/428* (2013.01)

(58) Field of Classification Search
CPC ....... B29C 51/36; B29C 51/428; B29C 51/30; B29C 33/306; B29C 33/305; B29C 51/10; B29L 2031/7132
See application file for complete search history.

*Primary Examiner* — Robert J Grun
(74) *Attorney, Agent, or Firm* — Chun-Ming Shih; HDLS IPR Services

(57) ABSTRACT

A molding changing apparatus having a holder, a cooling plate, and a mold set coupled to the cooling plate is disclosed. The cooling plate has at least one connecting pin disposed on the surface which is reverse to the surface where the mold set is disposed, and the holder has at least one pneumatic pin receptacle disposed thereon. The connecting pin of the cooling plate can be inserted into the connecting hole of the pneumatic pin receptacle of the holder, and the connecting pin is fastened by the pneumatic pin receptacle, thereby connecting the mold set and the cooling plate to the holder. Through the use of the connecting pin and the pneumatic pin receptacle, the mold set and the cooling plate on the holder can be changed rapidly and the efficiency of the plastic vacuum forming with mold sets is enhanced.

9 Claims, 4 Drawing Sheets

MOLD CHANGING APPARATUS

REFERENCE TO RELATED APPLICATIONS

This non-provisional application claims priority under 35 U.S.C. § 119(a) on Taiwan Patent Application No. 107214949 filed Nov. 2, 2018, the entire contents of which are incorporated herein by reference.

FIELD OF THE INVENTION

The invention relates to a mold changing apparatus, more particularly, to a mold changing apparatus that is capable of changing a set of mold and cooling plate on a holder rapidly, and therefore is advantageous in enhancing the efficiency of plastic vacuum forming with mold sets.

BACKGROUND

In industrial processing factory and manufacturing, two devices are often required to be temporarily connected for processing or manufacturing purposes. When the processing is complete, the two devices are then separated for the next process.

Take plastic vacuum forming process as an example, plastic material is first placed in a mold disposed on a holder and then softened by heating. After the plastic material is softened, the air in a space between the holder and the mold is sucked out to create vacuum condition and make the plastic material conform to the surface of the mold. The plastic vacuum forming process is complete when the molded plastic is cooled In general, a number of screws are used to affix the mold and the holder. When the mold needs to be changed, the screws are removed to take the mold off from the holder and then screwed in again after the replacement of the mold on the holder. However, installing and removing screws would take up a lot of time, especially if a sealed condition is required between the mold and the holder, more screws are needed. Hence, more time is spent on changing molds and in turn the manufacturing time and cost are increased.

SUMMARY

The invention provides a mold changing apparatus, which includes a holder, a cooling plate, and a mold set, wherein the cooling plate and the mold set on the holder can be removed and replaced quickly, thereby increasing the efficiency of changing mold sets.

The invention provides a mold changing apparatus, which includes a holder, a cooling plate, and a mold set, wherein the mold set is coupled to the cooling plate, and at least one connecting pin is disposed on the cooling plate. The holder has at least one pneumatic pin receptacle disposed thereon for connecting to and fastening with the connecting pin on the cooling plate, which in turn holds the mold set and the cooling plate firmly to the holder and thus the plastic vacuum forming can be performed. When a different shape of mold set is needed, the connecting pin is released by controlling the pneumatic pin receptacle for the mold set and the cooling plate to be taken off from the holder, and subsequently a different mold set and cooling plate is disposed and held firmly to the holder before performing the plastic vacuum forming process with the different mold set.

The present invention provides a mold changing apparatus, which includes a holder having a pneumatic pin receptacle, a cooling plate having at least connecting pin, and a mold set coupled to the cooling plate, wherein the cooling plate is held firmly to the holder by the connecting pin and the pneumatic pin receptacle. When changing between different mold sets, the mold set and the cooling plate can be removed from the holder by simply controlling the pneumatic pin receptacle with a pump, and then a new mold set and cooling plate can be installed. Hence the efficiency of plastic vacuum forming is enhanced.

The present invention provides a mold changing apparatus, which includes a holder with an accommodating space; at least one pneumatic pin receptacle disposed in the accommodating space and having a connecting hole; at least one connecting pin for inserting into the connecting hole of the pneumatic pin receptacle, wherein the pneumatic pin receptacle is used to fasten or release the connecting pin; a cooing plate coupled to the connecting pin, wherein the cooling plate is held firmly to the holder by the connecting pin and the pneumatic pin receptacle to cover the accommodating space of the holder; and a mold set, coupled to the cooling plate.

In one embodiment of the invention, the pneumatic pin receptacle includes a body, a movable part, a plurality of elastic units, and a plurality of spheres. The elastic units are disposed between the body and the movable part. The body includes an extension tube. The movable part includes a protrusion ring for accommodating part of the extension tube, and the spheres are disposed between the protrusion ring and the extension tube.

In one embodiment of the invention, the apparatus further includes a pump and an air-pressure chamber, wherein the pump is fluidly connected to the air-pressure chamber and can change the air pressure therein, and the movable part is placed in the air-pressure chamber and movable along the air-pressure chamber and relative to the body.

In one embodiment of the invention, the connecting pin includes a protruding unit, and the spheres are used to fasten the protruding unit of the connecting pin so the connecting pin is fastened to the pneumatic pin receptacle.

In one embodiment of the invention, the extension tube protrudes from the body and a plurality of through holes are disposed on the extension tube that protrudes out of the body.

In one embodiment of the invention, the apparatus includes a pump fluidly connected to the pneumatic pin receptacle for controlling the connection between the pneumatic pin receptacle and the connecting pin.

In one embodiment of the invention, an enclosed space is formed between the mold set and the cooling plate, and the cooling plate has a plurality of perforations fluidly connecting the enclosed space and the accommodating space of the holder.

In one embodiment of the invention, the holder is fluidly connected to a pump, through which the air pressure in the accommodating space and the enclosed space is changed and thereby forcing a plastic material to conform to the surface of the mold set.

In one embodiment of the invention, the mold set includes a plurality of molds.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
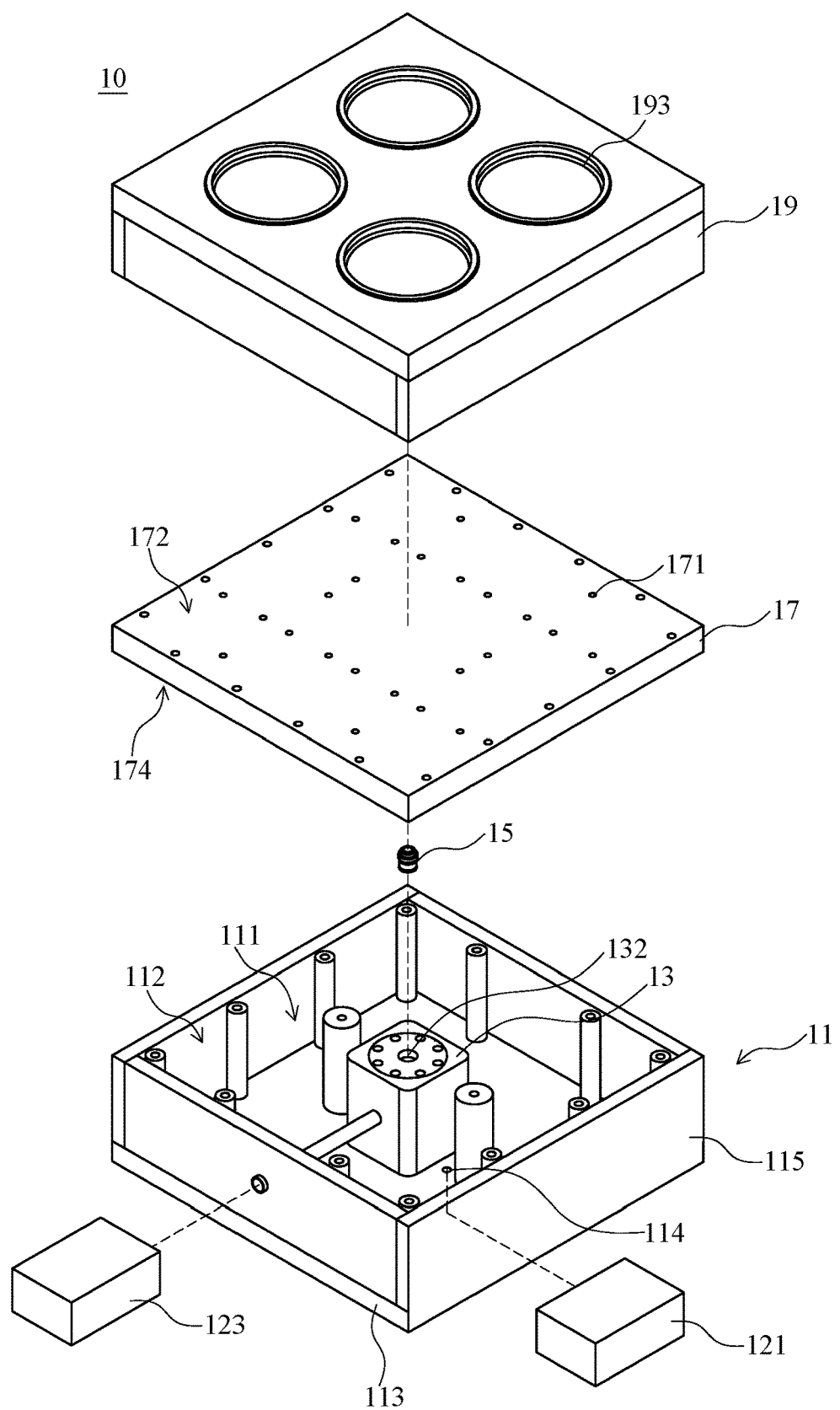
FIG. 1 is an exploded schematic diagram illustrating a mold changing apparatus according to an embodiment of the invention.
Figure 2:
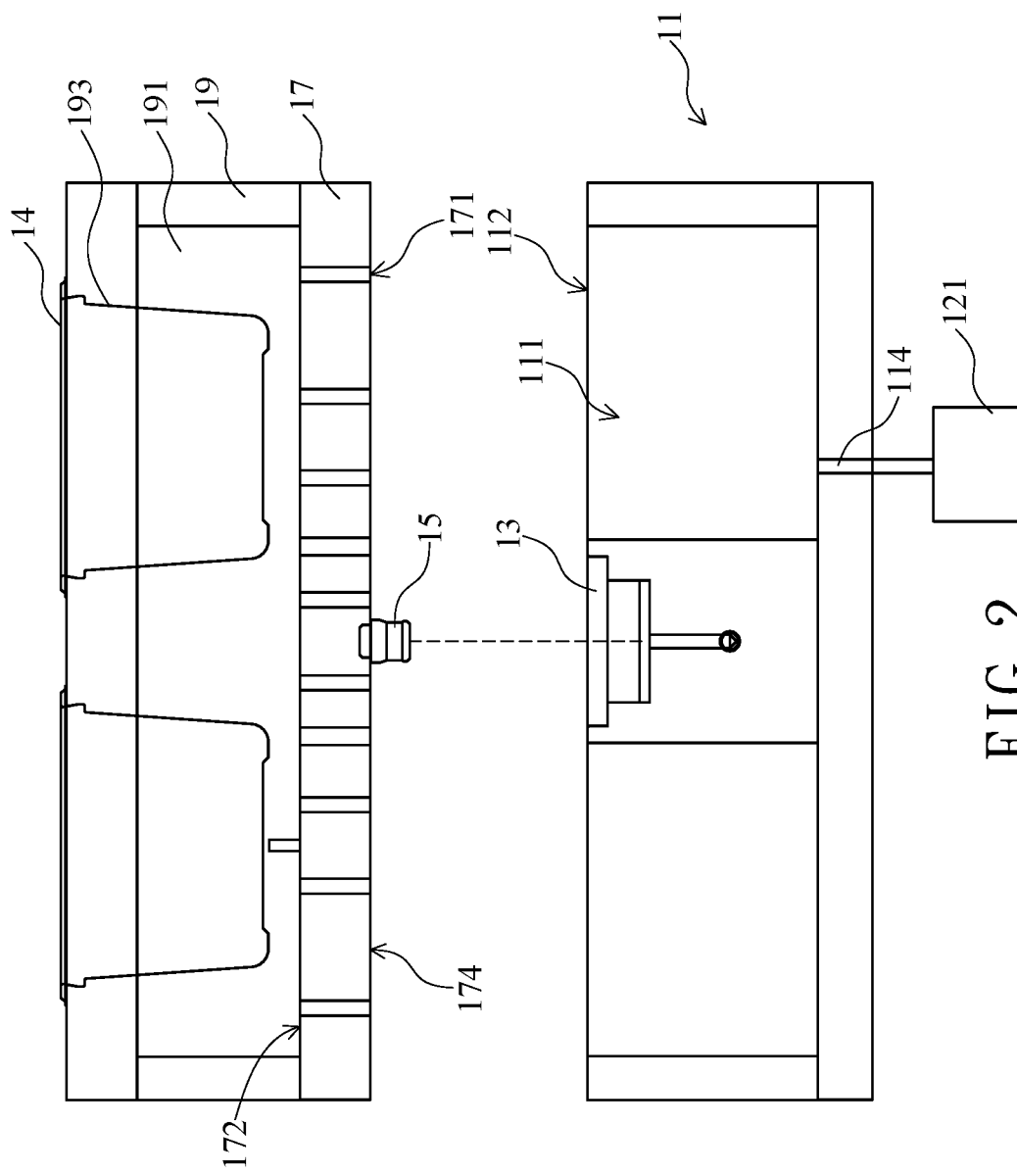
FIG. 2 is a side view of a mold changing apparatus according to an embodiment of the invention.

FIGS. 1 and 2 are, respectively, exploded schematic diagram and side view of a mold changing apparatus according to a preferred embodiment of the invention. The mold changing apparatus includes a holder 11, at least one pneumatic pin receptacle 13, at least one connecting pin 15, a cooling plate 17, and a mold set 19, wherein the holder 11, the cooling plate 17, and the mold set 19 are disposed in a stacked and overlapping manner.

The holder 11 includes an accommodating space 111, and the pneumatic pin receptacle 13 is disposed therein. In one embodiment of the invention, the holder 11 further includes a base board 113 and a plurality of side boards 115, of which the accommodating space 111 is formed. For example, the base board 113 and the side boards 115 can form a cubical accommodating space 111 with an opening 112 in the holder 11.

The holder 11 includes at least one via hole 114 fluidly connected to the accommodating space 111. In practice, the via hole 114 of the holder 11 connects to a first pump 121, wherein the first pump 121 can pump the air out of the accommodating space 111 through the via hole 114 of the holder 11.

The pneumatic pin receptacle 13 includes a connecting hole 132 for accommodating the connecting pin 15, and through a fastening mechanism in the pneumatic pin receptacle 13, the connecting pin 15 is fastened to the pneumatic pin receptacle 13. The detailed structure of the pneumatic pin receptacle 13 will be described later. In one embodiment, the pneumatic pin receptacle 13 is disposed on the base board 113 of the holder 11 and so the connecting hole 132 of the pneumatic pin receptacle 13 faces towards the opening 112 of the holder 111.

The cooling plate 17 is disposed on the holder 11, like on top of the opening 112 of the holder 11. To be more specific, the cooling plate 17 includes a first surface 172 and a second surface 174, wherein the second surface 174 of the cooling plate 17 faces the holder 11 and covers the accommodating space 111 of the holder, such that the accommodating space 111 between the holder 11 and the cooling plate 17 forms a confined space. The shape of the cooling plate 17 is, for example, similar to the shape of the opening 112 of the holder 11, and the surface area of the cooling plate 17 is slightly larger than the opening 112 of the holder 11, so that the cooling plate 17 can cover the opening 112.

The cooling plate 17 includes a plurality of perforations 171, wherein the perforations 171 penetrate through the first surface 172 and the second surface 174 of the cooling plate 17. When the cooling plate 17 is disposed on the holder 11, the perforations 171 of the cooling plate 17 are in fluid connection to the accommodating space 111 of the holder 11.

The mold set 19 is coupled to the cooling plate 17, for example, the mold set 19 is disposed on the first surface 172 of the cooling plate 17. In particular, the mold set 19 can be a hollow device and when the mold set 19 is coupled to the cooling plate 17, an enclosed space 191 is formed between the mold set 19 and the cooling plate 17, wherein the enclosed space 191 of the mold set 19 is fluidly connected to the accommodating space 111 of the holder by the perforations 171 of the cooling plate 17. In one embodiment, a plurality of screws are used to attach the mold set 19 and the cooling plate 17 are together The mold set 19 includes at least one molding mold 193, wherein the molding mold 193 is in contact with plastic material during plastic vacuum forming process. The molding mold 193 may include a plurality of tiny apertures (not shown) and is fluidly connected to the enclosed space 191 of the mold set 19.

In the plastic vacuum forming process, plastic material 14 is placed on the molding mold 193, and then the plastic material 14 covering the molding mold 193 is softened by heating. The first pump 121 is used to suck out air in the accommodating space 111 of the holder 11 and the enclosed space 191 of the mold set 19, such that the air pressure in the accommodating space 111 and the enclosed space 191 is lower than the atmospheric pressure on the outside.

Since the apertures of the molding mold 193 is in fluid connection to the enclosed space 191 of the mold set 19, the air pressure between the plastic material 14 and the molding mold 193 is also lower than the atmospheric pressure on the outside, and under the influence of the negative pressure, the softened plastic material 14 conforms to the surface of the molding mold 193. After the plastic material 14 that is conforming on the surface of the molding mold 193 is cooled and hardened, the plastic vacuum forming process is complete and the molded plastic material 14 can be removed from the molding mold 193.

In one embodiment, at least one channel (not shown) is disposed in the cooling plate 17, wherein cooling liquid can be injected into the channel of the cooling plate 17 and circulates therein. Thus, the temperature of the plastic material 14 laying on and conforming to the surface of the molding mold 193 is lowered by the cooling plate 17 and the hardening speed of the molded plastic material 14 is increased.

The connecting pin 15 is coupled to the cooling plate 17, for example, one end of the connecting pin 15 is attached to the second surface 174 of the cooling plate 17. When covering the accommodating space 111 of the holder 11 with the second surface 174 of the cooling plate 17, the connecting pin 15 on the second surface 174 is aligned to the pneumatic pin receptacle 13 on the holder 11 and inserted into the connecting hole 132 of the pneumatic pin receptacle 13. The pneumatic pin receptacle 13 fastens the connecting pin 15 in the connecting hole 132, and in turn the cooling plate 17 is held firmly on the holder 11. Moreover, the pneumatic pin receptacle 13 can also be used to unfasten and release the connecting pin 15. In other words, through the connecting pin 15 and the pneumatic pin receptacle 13, the cooling plate 17 can be held firmly on the holder 11 and cover the accommodating space 112 of the holder 11.

In practice, the pneumatic pin receptacle 13 can be fluidly connected to a second pump 123, wherein by controlling the pneumatic pin receptacle 13 through the second pump 123, the connecting pin 15 is fastened in the connecting hole 132 of the pneumatic pin receptacle 13. In one embodiment of the invention, the accommodating space 111 of the holder 11 and the pneumatic pin receptacle 13 respectively connect to different pumps, for example, the first pump 121 and the second pump 123. In a different embodiment, the first pump 121 and the second pump 123 are integrated into one pump and the accommodating space 111 of the holder 11 and the pneumatic pin receptacle 13 are connected to the same pump.

Unlike the conventional technology where multiple screws need to be removed and installed repeatedly, the cooling plate 17 and the holder set 19 disposed on the holder 11 can be rapidly changed by the use of the connecting pin 15 and the pneumatic pin receptacle 13 as shown by the invention, and therefore the efficiency of changing mold set 19 is increased substantially. In addition, the cooling plate 17 and the mold set 19 do not need to be disassembled during the mold changing process.

Figure 3:
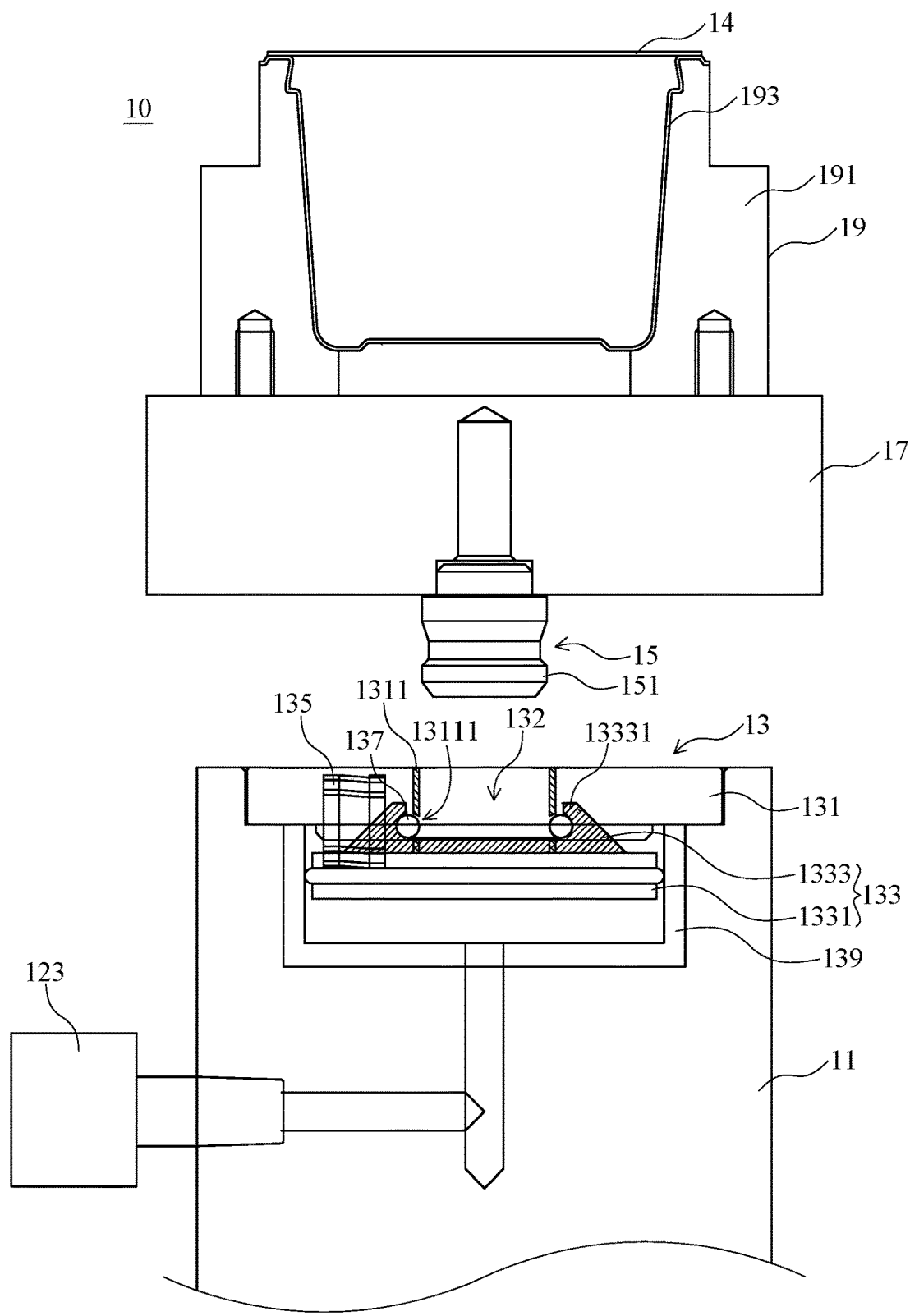
FIG. 3 is a side view of a mold changing apparatus according to another embodiment of the invention.
Figure 4:
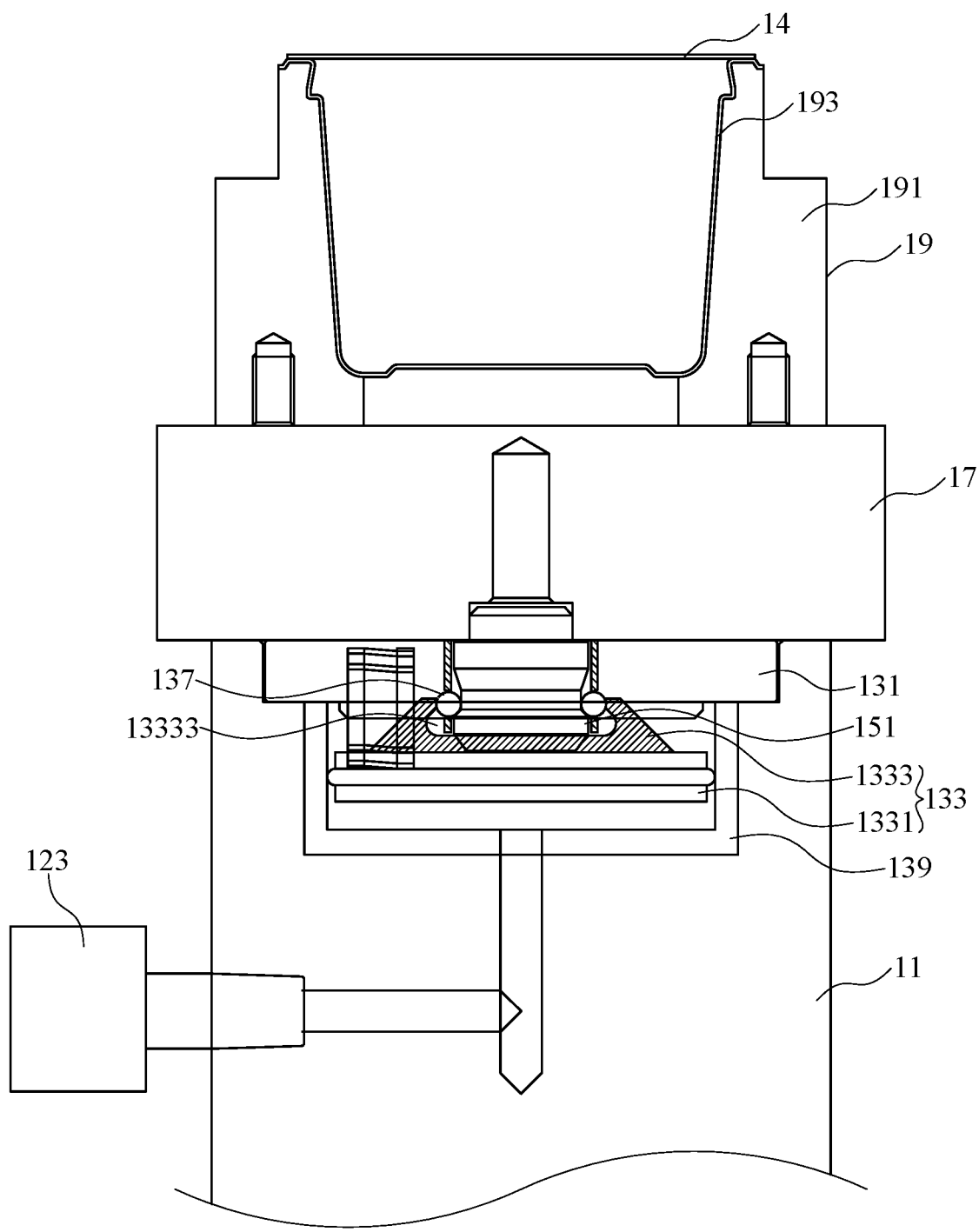
FIG. 4 is a side view of a mold changing apparatus according to another embodiment of the invention.

FIGS. 3 and 4 are, respectively, side views of a mold changing apparatus according to another preferred embodiment of the invention. The mold changing apparatus 10 includes a holder 11, at least one pneumatic pin receptacle 13, at least one connecting pin 15, a cooling plate 17, and a mold set 19, wherein the holder 11, the cooling plate 17, and the mold set 19 are disposed in a stacked and/or overlapping manner.

The detailed structure and coupling method of the holder 11, the cooling plate 17, and the mold set 19 have been described in the above embodiments corresponding to FIGS. 1 and 2 and therefore will not be repeated herein. What will be described in detail herein is the structure and connecting method of the connecting pin 15 and the pneumatic pin receptacle 13.

The pneumatic pin receptacle 13 includes a body 131, a movable part 133, a plurality of elastic units 135, and a plurality of spheres 137. The elastic unit 135 is disposed between the body 131 and the movable part 133 and when applied with an external force, the movable part 133 compresses the elastic units 135 and moves relative to the body 131. For example, the body 131 and the movable part 133 can have corresponding notches disposed thereon for accommodating part of the elastic units 135.

The body 131 includes an extension tube 1311, wherein the body 131 is a disc or a cylinder and has a center hole at its center position. The body 131 and the extension tube 1311 can be two components, wherein a part of the extension tube 1311 is disposed in the center hole of the body 131 such that part of the extension tube 1311 protrudes out of the body 131. In another embodiment of the invention, the body 131 and the extension tube 1311 can be a single integrated component.

The extension tube 1311 includes a connecting hole 132 and a plurality of through holes 13111. As shown in FIG. 3, the extension tube 1311 can be a circular pipe and the connecting hole 132 is a space formed in the extension tube 1311 for accommodating the connecting pin 15. The plurality of through holes 13111 are disposed on a surface of the extension tube 1311 and penetrate through the extension tube 1311.

In particular, a part of the extension tube 1311 protrudes from the body 131, for instance, protrudes toward the direction where the movable part 133 is disposed, and the through holes 13111 are disposed on the part of the extension tube 1311 that is protruded from the body 131.

The movable part 133 is disposed in a stacked manner with the body 131 and includes a base 1331 and a protrusion ring 1333, wherein the base 1331 is a disc or a cylinder and is disposed to overlap the body 131. The protrusion ring 1333 is disposed on a surface of the base 1331, like on the surface of the base 1331 facing the body 131, such that the protrusion ring 1333 is positioned between the base 1331 and the body 131. The base 1331 and the protrusion ring 1333 can be a single integrated component or two separate components.

The protrusion ring 1333 can be annular and accommodates part of the extension tube 1311. An inner surface of the protrusion ring 1333 has disposed thereon at least one protruding portion 13331, wherein the protruding portion 13331 is positioned on the inner surface of the protrusion ring 1333 that is near the body 131.

In one embodiment of the invention, the inner surface of the protrusion ring 1333 can also be disposed with at least one cavity 13333 as shown in FIG. 4, wherein the cavity 13333 is positioned between the protruding portion 13331 and the base 1331 for accommodating the sphere 137. Moreover, the number of cavities 13333 can be one and is an annular cavity disposed at the inner surface of the protrusion ring 1333. In another embodiment of the invention, the number of cavities 13333 can be plural and are semi-sphere or arc cavities disposed at the inner surface of the protrusion ring 1333.

The movable part 133 can move relative to the body 131 and therefore change the distance between the two. The plurality of elastic units 135 are disposed between the movable part 133 and the body 131, wherein two ends of the elastic unit 135 are in contact with the movable part 133 and the body 131, respectively.

The plurality of spheres 137 are positioned between the protrusion ring 1333 of the movable part 133 and the extension tube 1311 of the body 131. For example, the sphere 137 is disposed in the cavity 13333 of the protrusion ring 1333 and/or in the through hole 13111 of the extension tube 1311. The connecting pin 15 includes a protruding unit 151, wherein the protruding unit 151 is disposed at one end of the connecting pin 15 and is fastened by the sphere 137. Moreover, the diameter of the through hole 13111 of the extension tube 1311 is smaller than the diameter of the sphere 137, and so when the sphere 137 is being pushed by the protruding portion 13331 of the protrusion ring 1333, the sphere 137 does not pass through the through hole 13111.

In one embodiment of the invention, the pneumatic pin receptacle 13 includes an air-pressure chamber 139, wherein the movable part 133 is disposed in the air-pressure chamber 139 and is movable along the air-pressure chamber 139. The air-pressure chamber 139 is a confined space and is fluidly connected to the second pump 123, wherein the second pump 123 is used to change the air pressure in the air-pressure chamber 139 to make the movable part 133 move along the air-pressure chamber 139 relative to the body 131. In specific, when the second pump 123 pumps air into the air-pressure chamber 139, the air pressure in the air-pressure chamber 139 is increased, and when the pressure force in the air-pressure chamber 139 is greater than the elastic force of the elastic unit 135, the movable part 13 is pushed to move towards the direction of the body 131. The sphere 137 exits the connecting hole 132 of the extension tube 1311 at this stage, for example, enters into the cavity 13333 of the protrusion ring 1333, and so the protruding unit 151 of the connecting pin 15 is not restricted or fastened by the sphere 137. Thus, the connecting pin 15 can be taken out or inserted into the connecting hole 132 as shown in FIG. 3.

When the second pump 123 releases the air in the air-pressure chamber 139, the air pressure in the air-pressure chamber 139 is lowered and when the pressure force in the air-pressure chamber is smaller than the elastic force of the elastic unit 135, the distance between the movable part 133 and the body 131 is increased. The sphere 137 is now being pushed by the protruding portion 13331 on the inner surface of the protrusion ring 1333 to enter into the through hole 13111 of the extension tube 1311, wherein the partial volume of each sphere 137 gets into the connecting hole 132 of the extension tube 1311 via each through hole 1113 and protrudes out of the inner surface of the extension tube 1311. Hence, the connecting pin 15 is fastened to the pneumatic pin receptacle 13 as shown in FIG. 4.

Through the molding changing apparatus 10 of the invention, the fastening and releasing/unfastening of the connecting pin 15 to the connecting hole 132 is simply done by using the pump to control the pneumatic pin receptacle 13, and thus is able to remove and replace the mold set 19 and the cooling plate 17 rapidly. Therefore, the mold set 19 and the cooling plate 17 are able to be removed from the holder 11 rapidly and be replaced with different mold set 19 and/or the cooling plate 17, and the purpose of rapid mold changing is achieved.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A mold changing apparatus comprising:
  a holder, comprising an accommodating space;
  at least one pneumatic pin receptacle, disposed in the accommodating space of the holder and comprising a connecting hole;
  at least one connecting pin, wherein the connecting pin is to be inserted into the connecting hole of the pneumatic pin receptacle, and the pneumatic pin receptacle fastens or releases the connecting pin;
  a cooling plate, coupled to the connecting pin, wherein the cooling plate is held firmly to the holder by the connecting pin and the pneumatic pin receptacle and covers the accommodating space of the holder; and
  a mold set coupled to the cooling plate.

2. The mold changing apparatus of claim 1, wherein the pneumatic pin receptacle comprises a body, a movable part, a plurality of elastic units and a plurality of spheres, wherein the body comprises an extension tube, the movable part comprises a protrusion ring for accommodating part of the extension tube, the elastic units are disposed between the body and the movable part, and the spheres are disposed between the protrusion ring and the extension tube.

3. The mold changing apparatus of claim 2, wherein the pneumatic pin receptacle comprises an air-pressure chamber and the movable part is disposed therein, wherein the air-pressure chamber is fluidly connected to a pump, and the pump is used to change the air pressure inside the air-pressure chamber to make the movable part move along the air-pressure chamber and relative to the body.

4. The mold changing apparatus of claim 2, wherein the connecting pin comprises a protruding unit, wherein the protruding unit of the connecting pin is fastened by the spheres to fasten the connecting pin to the pneumatic pin receptacle.

5. The mold changing apparatus of claim 4, wherein the extension tube protrudes from the body, and a plurality of through holes are disposed on the extension tube protruding out of the body, wherein the spheres fasten the protruding unit via the through holes of the extension tube.

6. The mold changing apparatus of claim 1, further comprising a pump fluidly connected to the pneumatic pin receptacle, wherein the pump is used to control the connection between the pneumatic pin receptacle and the connecting pin.

7. The mold changing apparatus of claim 1, wherein an enclosed space is formed between the mold set and the cooling plate, and the cooling plate comprises a plurality of perforations fluidly connecting the enclosed space and the accommodating space of the holder.

8. The mold changing apparatus of claim 7, wherein the holder is fluidly connected to a pump, and the pump is used to change the air pressure inside the accommodating space and the enclosed space to make a plastic material on the mold set to conform to the surface of the mold set.

9. The mold changing apparatus of claim 1, wherein the mold set comprises a plurality of molds.

* * * * *